Patented Feb. 9, 1954

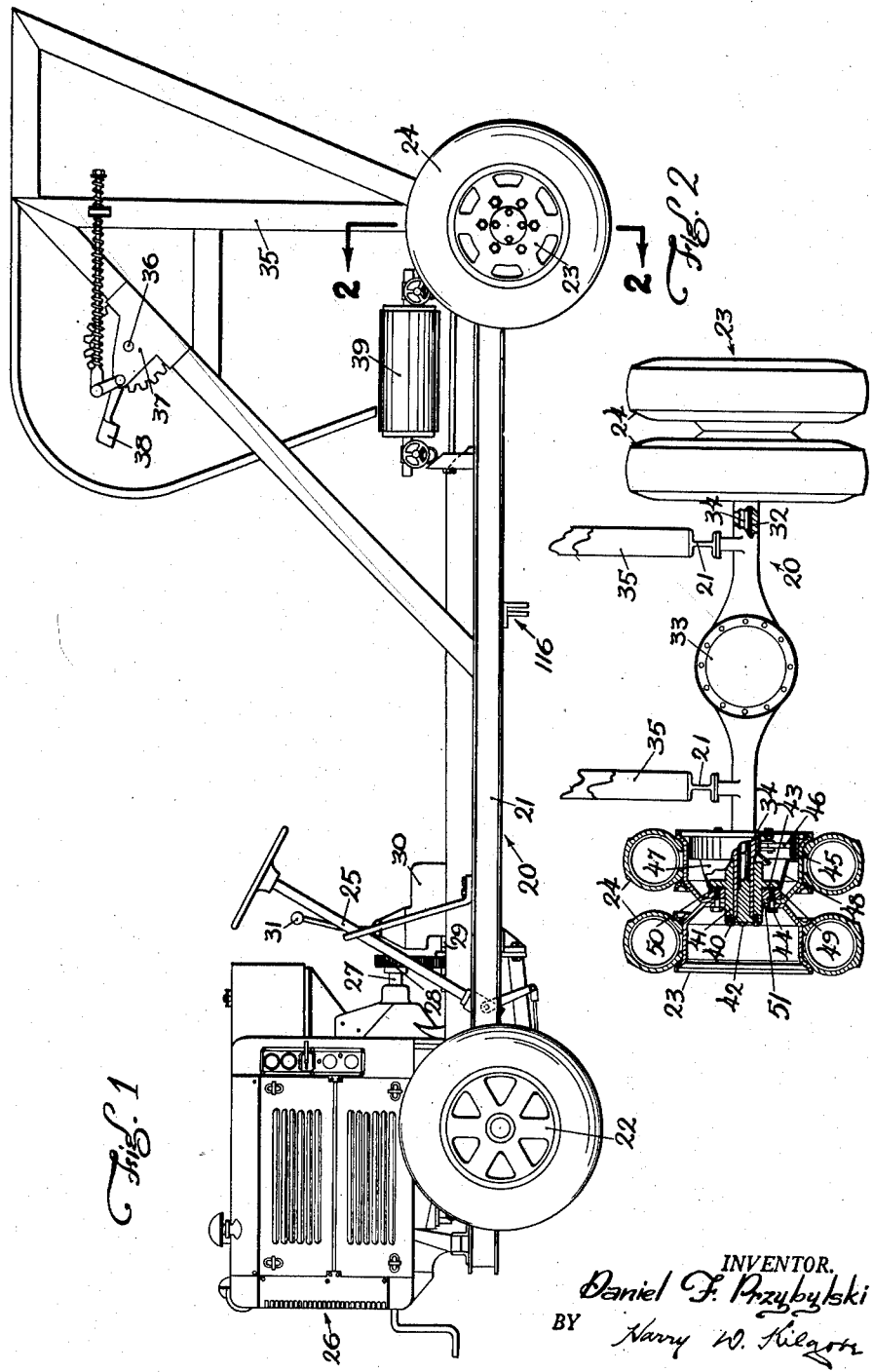

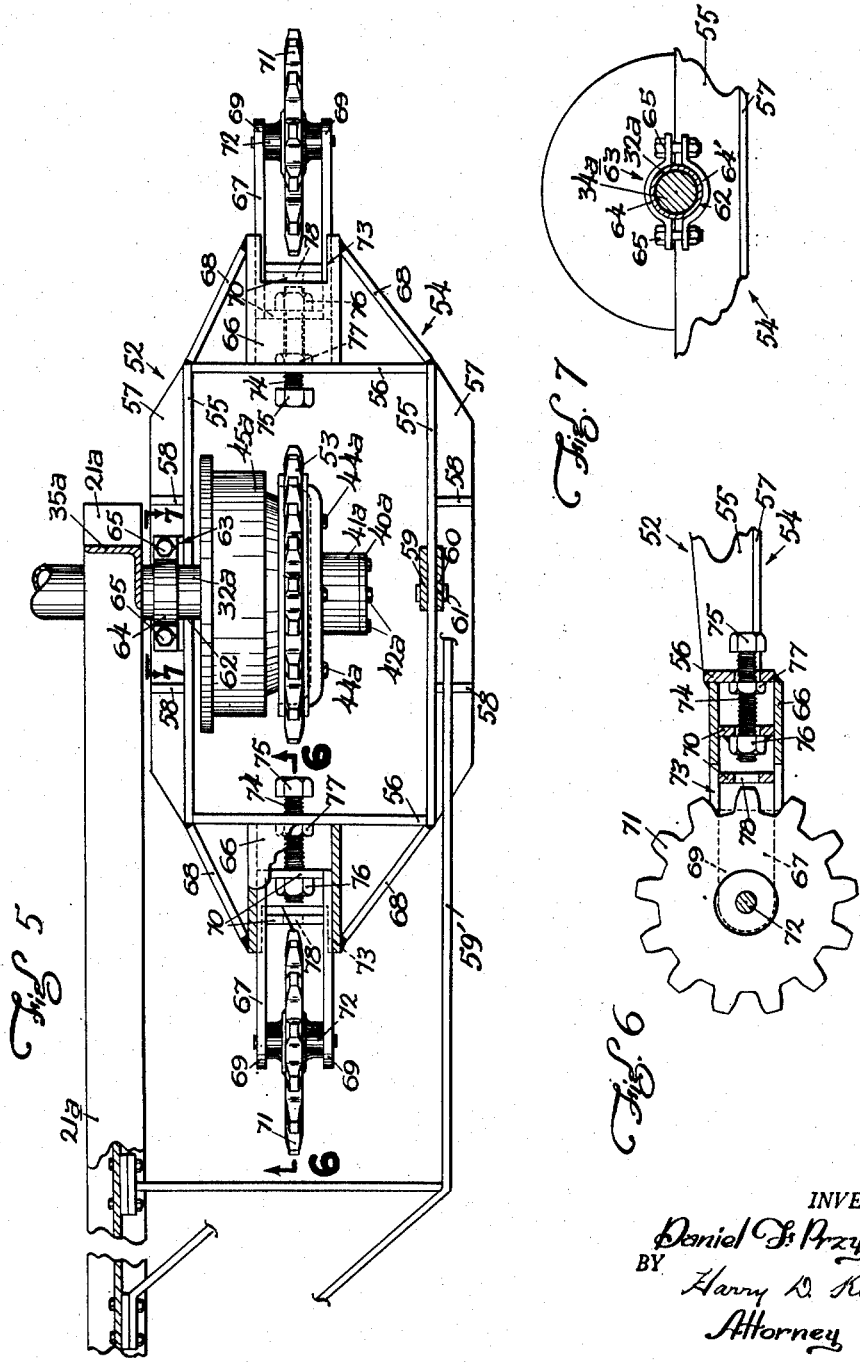

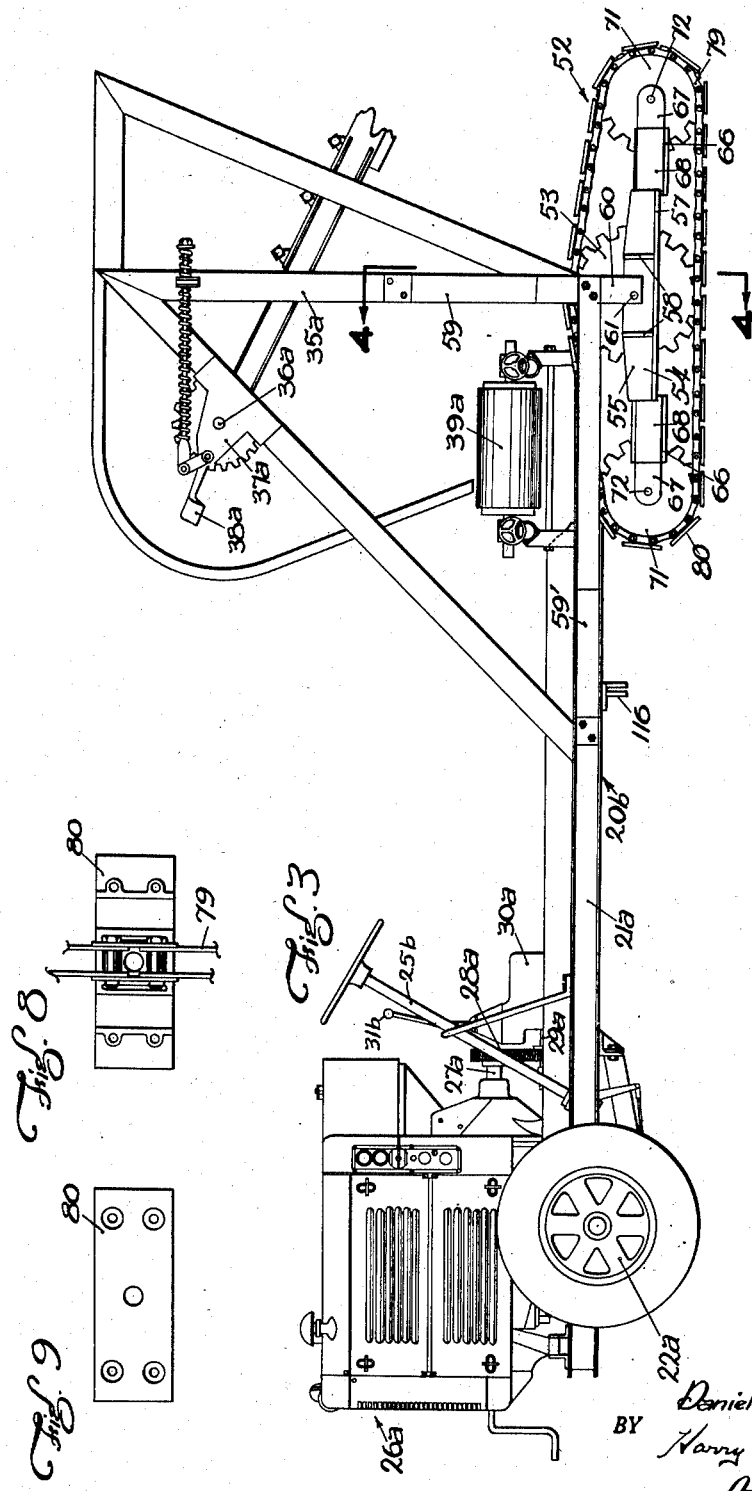

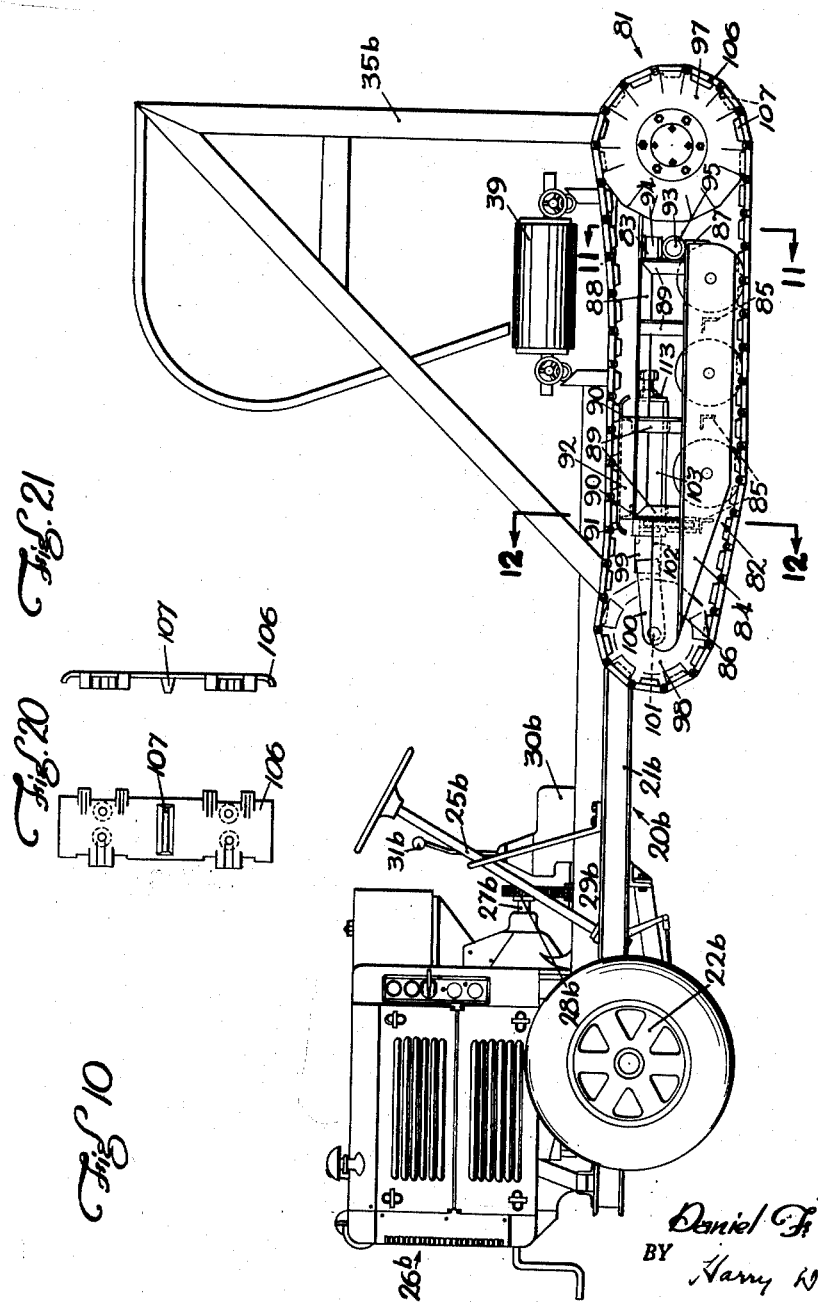

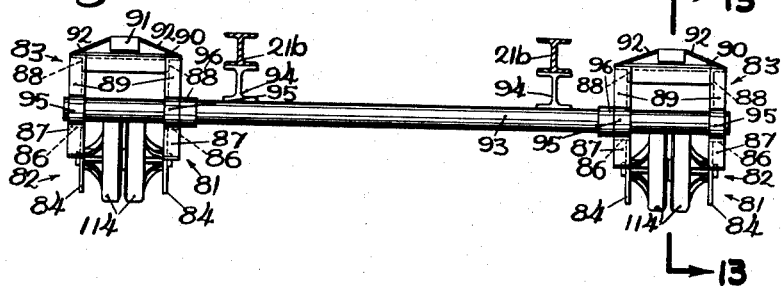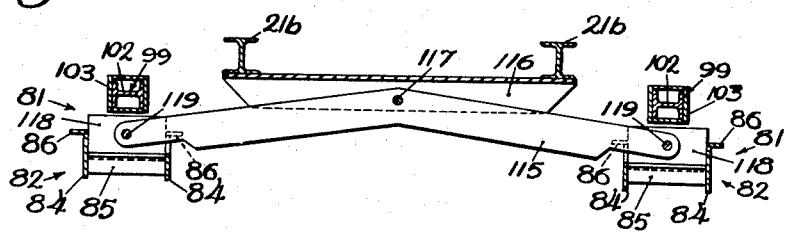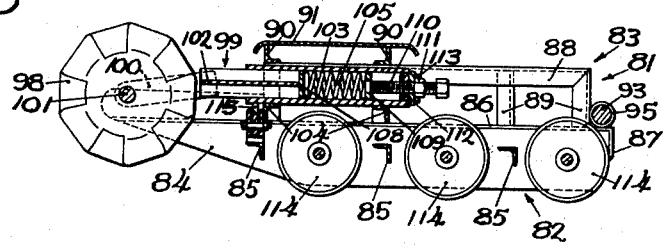

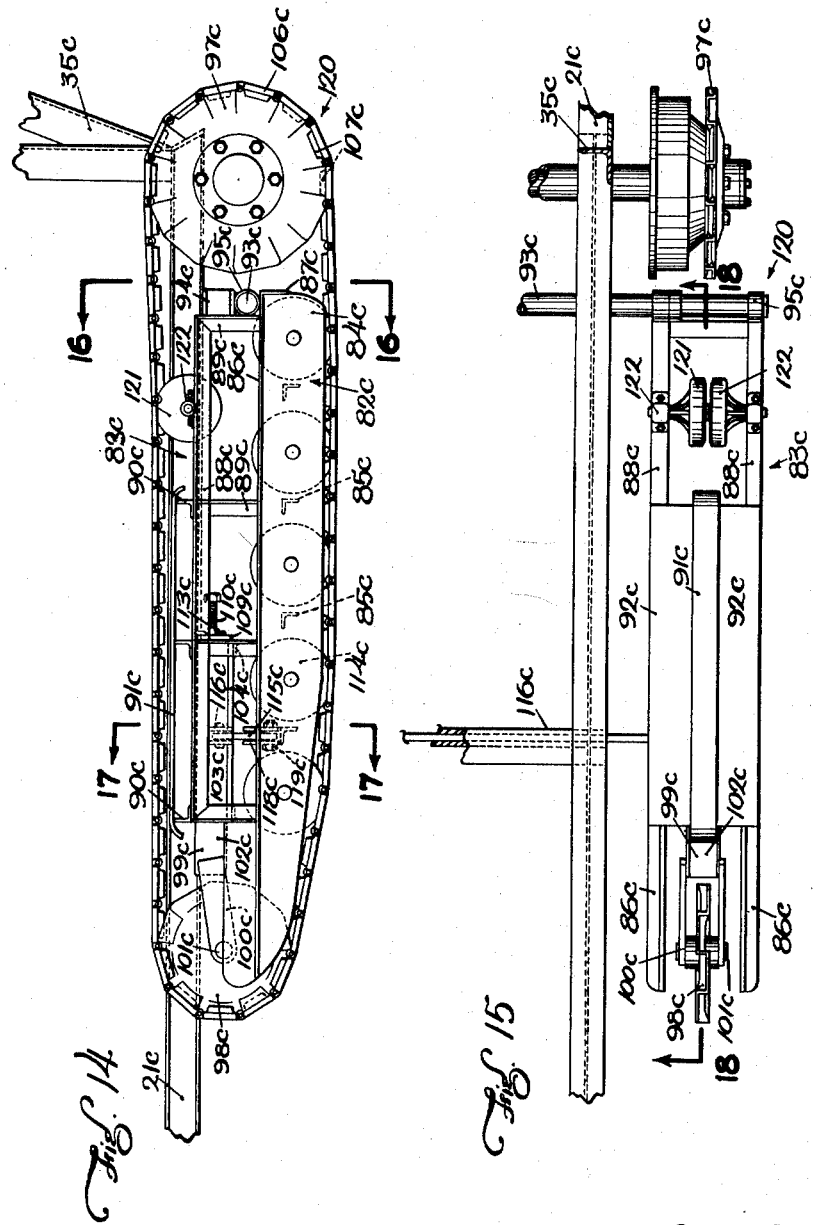

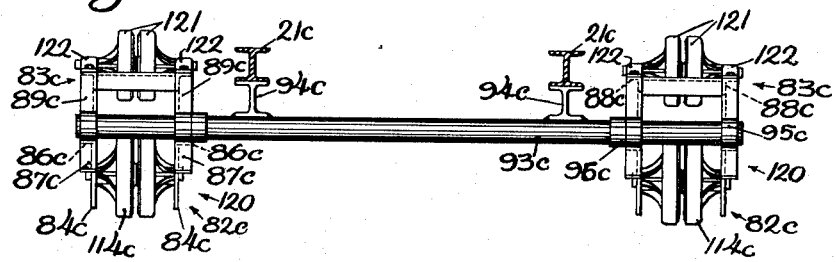
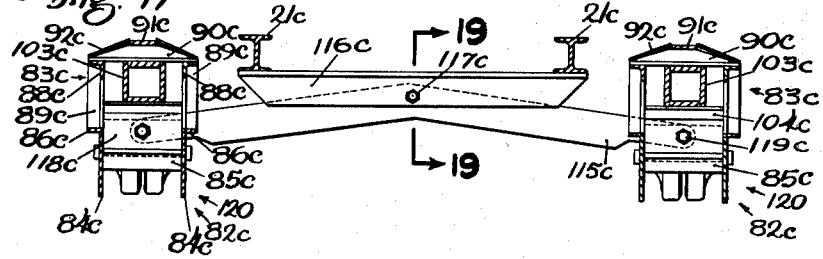
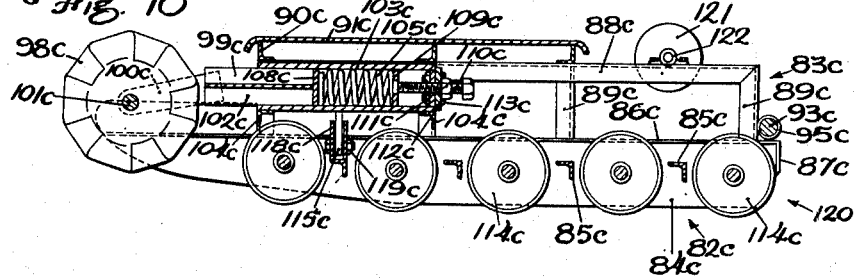
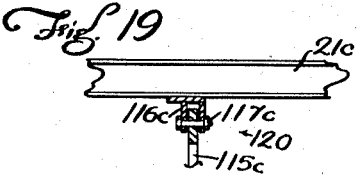

2,668,738

UNITED STATES PATENT OFFICE 2,668,738

INTERCHANGEABLE GROUND TRACTION FOR SELF-PROPELLED VEHICLES

Daniel F. Przybylski, Winona, Minn.

Application January 27, 1949, Serial No. 73,092

1 Claim. (Cl. 305—9)

My present invention relates to improvements in interchangeable ground traction for vehicles intended for general use but especially well adapted for use in connection with my Trench Excavator disclosed and broadly claimed in my pending application filed September 7, 1948, under Serial Number 48,121, and now Patent Number 2,584,287 granted February 5, 1952.

The object of this invention is to provide means on a self-propelled vehicle for mounting interchangeable different types of traction to meet different ground conditions on the job or on the road.

To the above end, the invention consists of the novel traction devices and combination of such devices.

In the accompanying drawings, which illustrate the invention, like characters indicate like parts throughout the several views.

Referring to the drawings:

Fig. 1 is a fragmentary elevational view of a self-propelled trench excavator including a truck frame mounted on front steering wheels and rear dual driving wheels equipped with pneumatic tires, some parts being broken away and sectioned;

Fig. 2 is a view partly in rear end elevation and partly in transverse vertical section taken on the line 2—2 of Fig. 1;

Fig. 3 is a view corresponding to Fig. 1, with the exception that half tracks have been substituted for the rear dual wheels;

Fig. 5 is a fragmentary view principally in plan, with some parts sectioned on the line 5—5 of Fig. 4;

Figure 4:
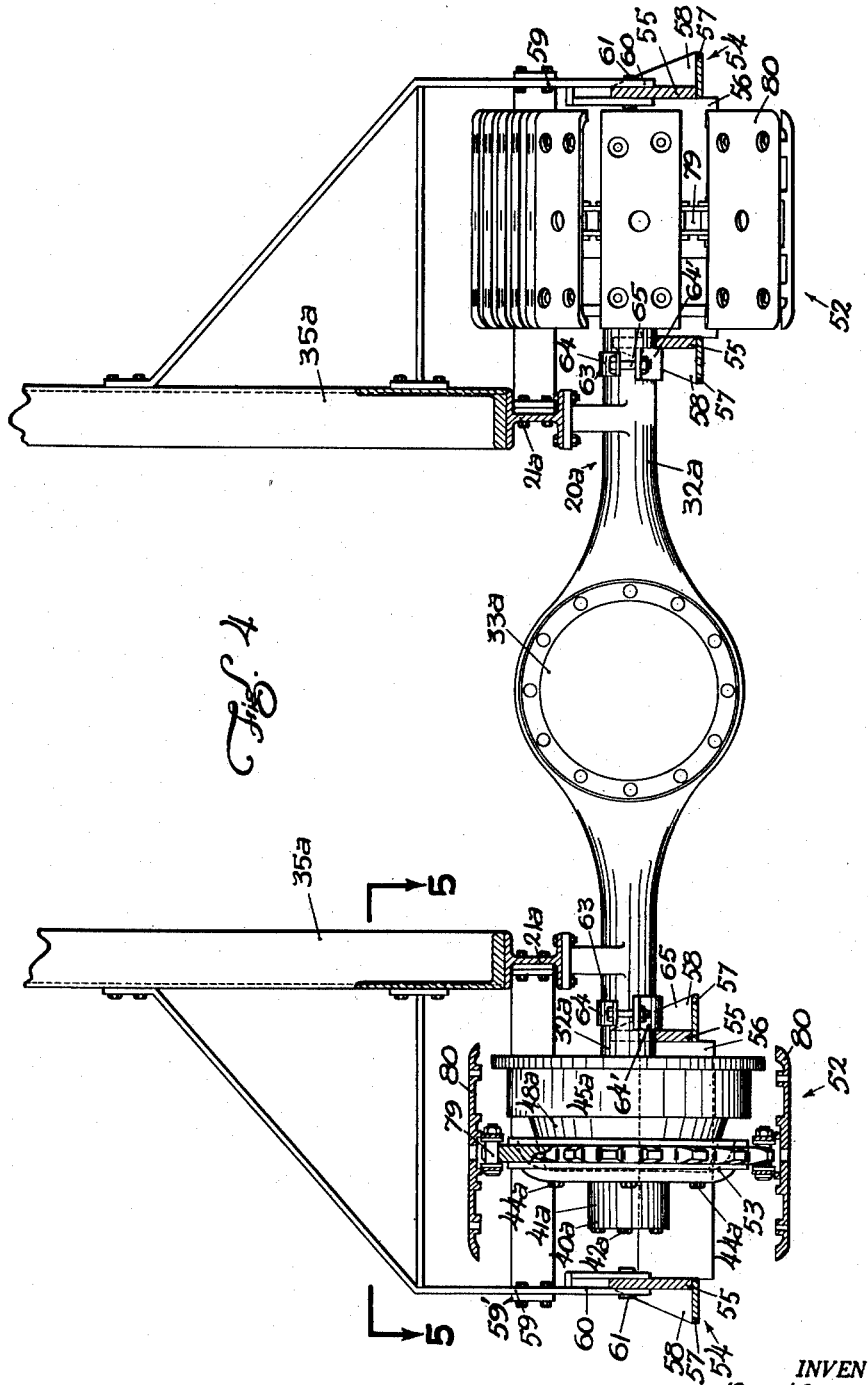
Fig. 4 is a view partly in rear end elevation and partly in transverse vertical section taken on the line 4—4 of Fig. 3.

Figs. 6 and 7 are detail views partly in elevation and partly in longitudinal vertical section taken, respectively, on the lines 6—6 and 7—7 of Fig. 5;

Fig. 8 is a plan view of one of the cleats and a fragment of the attached driving chain, as shown in Fig. 4;

Fig. 9 is a bottom plan view of the cleat, shown in Fig. 8;

Fig. 10 is a view corresponding to Fig. 1, with the exception that three-quarter tracks have been substituted for the rear dual wheels;

Figs. 11 and 12 are views partly in elevation and partly in transverse vertical section taken, respectively, on the lines 11—11 and 12—12 of Fig. 10;

Fig. 13 is a view partly in elevation and partly in longitudinal vertical section taken on the line 13—13 of Fig. 11;

Fig. 14 is a view corresponding to Fig. 1, but much more fragmentary, with the exception that full tracks have been substituted for the rear dual wheels;

Fig. 15 is a fragmentary plan view of the parts shown in Fig. 14;

Figs. 16 and 17 are views partly in elevation and partly in section taken on the lines 16—16 and 17—17, respectively, of Fig. 15;

Fig. 18 is a view partly in side elevation and partly in longitudinal vertical section taken on the line 18—18 of Fig. 15;

Fig. 19 is a fragmentary detail view with some parts sectioned on the line 19—19 of Fig. 17;

Fig. 20 is an inside plan view of one of the three-quarter track cleats; and

Fig. 21 is a longitudinal edge portion of the same.

The invention shown in Figs. 1 and 2 will first be described in detail, to wit: the numeral 20 indicates a self-propelled truck and of the parts thereof, it is important to note the longitudinal sills 21, the front steering wheels 22, and the rear dual wheels 23 equipped with pneumatic tires 24, the steering mechanism 25, the internal combustion engine 26, its shaft 27 with connections 28 to the shaft 29 of transmission mechanism in the housing 30, the gear shift lever 31, the rear axle housing 32, the differential housing 33 and the axle drive shafts 34 journaled in the rear axle housing 32. For the purpose of this case, it is not thought necessary to show the driving connections from the transmission mechanism through the differential mechanism to the axle drive shafts 34, for the reason that it is so well known.

The engine 26 is mounted on the front end portions of the sills 21 and a trench excavator frame 35 is mounted on said sills at their rear end portions. A shovel drive shaft 36 is journaled in bearings 37 on the frame 35. Certain parts of shovel scraping means 38 are mounted on the frame 35. A cross-conveyor 39 is mounted on the sills 21 under the frame 35.

Integral with the outer end of each axle drive shaft 34 is an annular flange 40 that caps the respective end of the axle housing 32. A hub 41 is mounted on each outer end portion of the rear axle housing 32 which is of reduced diameter. The hubs 41 are detachably secured to the flanges 40 by machine screws 42 that extend through holes in said flanges and have threaded engagement with the adjacent end portions of the hubs 41. Integral with each hub 41, at its intermediate portion, is an annular flange 43 having a plurality of outwardly projecting circumferentially spaced nut-equipped screw studs 44.

A brake drum 45, having therein brake mechanism 46, is provided with a housing 47 having an outwardly tapered section 48. On the outer end of the housing section 48 is an inturned flange 49 that overlaps the outer side of the flange 43 and is secured thereto by the screw studs 44. A washer-like ring 50 is mounted on each hub 41 and provided with holes through which the screw studs 44 project. The webs 51 of the dual wheels 23 have axial apertures through which the hubs 41 project and holes for the screw studs 44 that clamp said webs onto the spacing rings 50.

Referring now in detail to the invention shown in Figs. 3 to 9, inclusive, wherein half tracks 52 have been substituted for the dual wheels 23. Parts in Figs. 3 to 9, inclusive, that correspond to like parts in Figs. 1 and 2 are given the same reference numerals followed by the letter $a$. To make the substitution above noted, it was necessary only to remove the nuts of the screw studs 44, withdraw the dual wheels 23 and the spacing rings 50 from said screw studs and the hubs 41 and in place thereof mount the sprocket wheels 53 of the half tracks 52 on the hubs 41$^a$ by axial movements to project the screw studs 44$^a$ through holes provided therefor in the webs of the sprocket wheels 53 and replace the nuts of said screw studs.

Each half track 52, in addition to its sprocket wheel 53, includes a horizontally disposed rectangular frame 54 comprising relatively long side bars 55 and relative short end bars 56. The frame bars 55 and 56 are flat and positioned vertically edgewise. On the lower longitudinal edge portions of the frame side bars 55 are outwardly projecting reinforcing flanges 57 and pairs of short upright reinforcing plates. The frame 54, at its outer side bar 55, is secured to the frame 35$^a$ by a hanger bracket 59 having a bifurcated lower end portion 60 that straddles said side bar and is secured thereto by a pin 61. The hanger bracket 59 is secured at its lower end portion to the respective sill 21$^a$ by a brace 59'. The inner side bar 55, at its upper longitudinal edge portion, is notched at 62 to receive the axle housing 32$^a$ and is held suspended from said housing by a clamp 63. This clamp 63 comprises a saddle 64 that rests transversely on the axle housing 32$^a$ and a lower member 64' in which said housing rests. This lower clamp member 64' is rigidly secured to the frame bar 55. A pair of draw bolts 65 extend through holes in the end portions of the saddle 64 and the lower clamp member 64$^a$ and connect said saddle to the lower clamp member 64$^a$.

On each end of the frame 54 is a horizontally disposed box-like guide 66 for a sprocket wheel bracket 67. The guides 66 are aligned with the driven sprocket 53 that is within the frame 54. Converging brace plates 68 for the guides 66 extend from the corners of the frame 54 to the outer ends of said guides. Each bracket 67 includes a pair of laterally spaced side plates 69 and a pair of laterally spaced cross-tie plates 70 that rigidly connect said side plates at their inner end portions. These brackets 67 are slidably mounted in the guides 66 and project outwardly thereof. An idle sprocket wheel 71 is journaled on a short shaft 72 secured in the outer end portions of the side plates 69 of each bracket 67. The idle sprocket wheels 71 are aligned with the driven sprocket wheel 53 and the upper and lower members of the guides 66 are notched at 73 to afford clearance for said idle sprocket wheels.

The brackets 67 may be endwise adjusted in the guides 66 to either retract or project the idle sprocket wheels 71 by take-up screw rods 74 having heads 75. These screw rods 74 have threaded engagement with nuts 76 rigidly secured to the end cross-tie plates 70 on their inner sides. Nuts 77 on the screw rods 74 impinge the frame end bars 56 as bases of resistance. Holes 78 in the inner cross-tie plates 70 permit free endwise movements of the screw rods 74 therethrough. Sprocket chains 79, driven by the sprocket wheels 53, run over the idle sprocket wheels 71. Cleats 80 pivoted to the sprocket chains 79 afford endless tracks. Obviously, the screw rods 74 afford tighteners for the sprocket chains 79.

Referring now in detail to the invention shown in Figs. 10 to 13, inclusive, wherein three-quarter tracks 81 have been substituted for the half tracks 52, shown in Figs. 3 to 9, inclusive, like parts in Figs. 10 to 13, inclusive, that correspond to like parts in Figs. 1 and 2 are given the same reference numerals followed by the letter $b$. Each three-quarter track 81 includes a lower main frame 82 and an upper secondary frame 83. The main frame 82 includes a pair of laterally spaced side plates 84 rigidly connected by front, intermediate, and rear cross-tie angle bars 85. On the upper longitudinal edges of the side plates 84 are outturned reinforcing flanges 86 and on the rear ends of said side plates are downturned flanges 87 that form continuations of the flanges 86. The side plates 84, at the forward portions of its lower longitudinal edge portions, are upwardly inclined.

The secondary frame 83 includes a pair of longitudinal angle bars 88 that overlie the side plates 84 and are supported therefrom by front, intermediate and rear pairs of short angle bar posts 89. The secondary frame 83 further includes a pair of cross-tie angle bars 90 that connect the longitudinal angle bars 88 at their forward end portions. Mounted on the cross-tie angle bars 90 at the transverse center of secondary frame 83, is a longitudinally extended plate 91 having downturned portions, for a purpose that will presently appear. Cover plates 92 extend from the longitudinal edges of the plate 91 transversely downwardly to the longitudinal angle bars 82, see Fig. 11.

Each three-quarter track 81 is mounted on a fixed transverse shaft 93 enabling it to oscillate in a vertical plane. This shaft 93 is held suspended from and under the sills 21$^b$ by short H beams 94 rigidly secured to said sills and shaft. The shaft 93 extends through a pair of aligned tubes 95 on each track 81 that rest on the flanges 86 and against the rearmost pair of posts 89 to which they are rigidly secured. Stop collars 96 on the shaft 93 are engaged by the innermost tubes 95 and limit inward sliding movement of the tubes 95 on the shaft 93. A relatively large driven sprocket wheel 97, of the self-cleaning type, is mounted on each hub 41$^b$ and secured thereto by the screw studs 44$^b$ for rotation with the axle drive shaft 34$^b$. At the front end of each track 81 is a relatively small idle sprocket wheel 98 aligned with the driven sprocket wheel 97.

On the front end of each track 81 is a mount and a take-up for each idle sprocket wheel 98 similar to the sprocket wheel 97. Each mount is a bracket 99 that includes a pair of forwardly and downwardly projecting laterally spaced bearing bars 100 between which the idle sprocket wheel 98 extends. This idle sprocket wheel 98 is secured to a short shaft 101 journaled in a pair of aligned holes in the forward end portions of the bearing bars 100. These bearing bars 100, at their rear end portions, overlap the forward end portions of a horizontally disposed I-member 102 slidably mounted in a box-like guide 103. This guide 103 is supported on and rigidly secured to a pair of transverse angle bars 104 that rest on the flanges 86 of the side plates 84 to which they are rigidly secured. The bracket 99 is yieldingly pressed forwardly by a coiled spring 105 to tension the three-quarter track 81 which comprises hinged cleats 106 having teeth 107 that mesh with aligned sprocket wheels 97 and 98. This spring 105 is held compressed between a plate 108 that bears against the inner end of the I-member 102 and a follower plate 109 which is adjusted in the guide 103 by a long head-equipped take-up screw rod 110. The screw rod 110 has threaded engagement with a nut 111 rigidly secured to a plate 112 that closes the inner end of the guide 103 and secured thereto by machine screws 113. The lower run of the sprocket chain 106 runs under front, intermediate and rear pairs of idle directional wheels 114 journaled in the side plates 84 of the main frame 82.

The two tracks 81 are cross-connected at their front end portions for independent oscillatory movement by a front axle 115 in the form of a flat bar that is edgewise upwardly bowed. This axle 115, at its intermediate portion, extends between the side members of a bolster 116 in the form of an inverted channel that extends transversely under the sills 21$^b$ and rigidly secured thereto. The axle 115 at its longitudinal center is pivoted at 117 to the bolster 116 and its end portions extend between the sides of short narrow channel members 118 and pivoted thereto at 119. The channel members 118 extend between the side plates 84, rest on the angle bars 85 and are rigidly secured thereto. The upper run of the sprocket chain 106 is supported on the plate 91.

The full tracks 120 shown in Figs. 14 to 19, inclusive, are of the same structure as the three-quarter tracks 81 except that they are longer with certain added parts. Parts shown in Figs. 14 to 19, inclusive, that correspond to like parts shown in Figs. 1 and 2 and like parts that correspond to like parts in Figs. 10 to 13, inclusive, are given the same reference numerals followed by the letter c. Each full track 120 has five pairs of wheels 114$^c$ in place of three pairs shown in the three-quarter track 81. The upper run of each full track 120 between the plates 91$^c$ and the sprocket wheels 97$^c$ is supported on a pair of idle wheels 121 similar to the wheels 114. These wheels 121 are journaled in bearings 122 on the angle bars 88$^c$. When the full track 120 is used, the front steering wheels 22 are dispensed with.

From the above description, it is evident that the purchaser of this equipment may select a machine equipped with the type of traction best suited to his general needs, and the digging conditions most frequently encountered, and at the same time have available for installation on the same machine, on the job if necessary, any of the other three types of traction than that with which the machine was originally equipped, to meet any possible ground condition.

What I claim is:

A main frame, a rectangular frame on each side thereof and pivoted relative to the main frame to swing about a horizontal axis, a driven axle, the end portions of which extend transversely into the rectangular frames, a sprocket wheel fixed to each end portion of the axle at substantially the transverse center of the respective rectangular frames, a long guide secured to each rectangular frame at each of its ends and projecting outwardly thereof, and having channel side members in opposing relation, a long slide mounted in the side members of each guide, each slide, at its outer end portion being bifurcated to afford a pair of prongs, an idle sprocket extending between the prongs of each pair and pivoted thereto, all of the sprocket wheels, the guides, and the slides being in the same vertical plane, means for moving the slides in their guides and for holding the same where positioned, and a sprocket chain arranged to run over the sprocket wheels of each rectangular frame.

DANIEL F. PRZYBYLSKI.

References Cited in the file of this patent

UNITED STATES PATENTS

| Number | Name | Date |
|---|---|---|
| 1,354,219 | Seltenright | Sept. 28, 1920 |
| 1,404,520 | Gregory | Jan. 24, 1922 |
| 1,442,550 | Wickersham | Jan. 16, 1923 |
| 1,685,676 | Linn | Sept. 25, 1928 |
| 1,774,835 | Lombard | Sept. 2, 1930 |
| 1,808,735 | Henneuse et al. | June 2, 1931 |
| 1,980,849 | Christie | Nov. 13, 1934 |
| 1,991,502 | Henneuse | Feb. 19, 1935 |
| 2,110,587 | Bennett et al. | Mar. 8, 1938 |
| 2,288,474 | Manning | June 30, 1942 |